United States Patent [10] Patent No.: US 11,310,963 B2
Burnley et al. [45] Date of Patent: Apr. 26, 2022

(54) AUTOMATED FILL STRATEGY FOR GRAIN CART USING OPEN-LOOP VOLUMETRIC ESTIMATION OF FILL LEVEL

(71) Applicant: Deere & Company, Moline, IL (US)

(72) Inventors: Ryan C. Burnley, Ankeny, IA (US); Ryan R. White, Polk, IA (US)

(73) Assignee: Deere & Company, Moline, IL (US)

( * ) Notice: Subject to any disclaimer, the term of this patent is extended or adjusted under 35 U.S.C. 154(b) by 250 days.

(21) Appl. No.: 16/670,297

(22) Filed: Oct. 31, 2019

(65) Prior Publication Data

US 2021/0127582 A1 May 6, 2021

(51) Int. Cl.
*A01D 90/02* (2006.01)
*A01D 41/127* (2006.01)
(Continued)

(52) U.S. Cl.
CPC ......... *A01D 90/02* (2013.01); *A01D 41/1271* (2013.01); *B65G 67/22* (2013.01);
(Continued)

(58) Field of Classification Search
CPC .... A01D 90/02; A01D 41/1271; B65G 67/22; G05D 1/02; G05D 2201/0201; H04L 67/12
See application file for complete search history.

(56) References Cited

U.S. PATENT DOCUMENTS

| 8,606,454 B2 | 12/2013 | Wang et al. |
| 10,015,928 B2 | 7/2018 | Nykamp et al. |

(Continued)

FOREIGN PATENT DOCUMENTS

| DE | 102008002006 A1 | 12/2009 |
| EP | 2057884 A1 | 5/2009 |

(Continued)

OTHER PUBLICATIONS

European Search Report issued in counterpart application No. 20198467.1 dated Mar. 22, 2021 (07 pages).

*Primary Examiner* — Calvin Cheung
(74) *Attorney, Agent, or Firm* — Christopher R. Christenson; Kelly, Holt & Christenson PLLC

(57) ABSTRACT

An agricultural harvester includes a cutting head configured to harvest an agricultural material, a transfer mechanism configured to transfer the harvested agricultural material from the agricultural harvester, and a fill management system. The fill management system is configured to provide open-loop control of an automated transfer of the agricultural material from the agricultural harvester. The fill management system includes a controller, a user interface module coupled to the controller and configured to receive user input indicative of a selected nudge direction, and a wireless communication module coupled to the fill management system and configured to communicate wirelessly with a receiving vehicle. The wireless communication module is configured to obtain storage dimensions relative to the receiving vehicle from the receiving vehicle. At least one sensor is operably coupled to the transfer mechanism and provides a sensor signal that is indicative of flow of the agricultural material through the transfer mechanism. The controller is configured to automatically generate relative positional adjustments between the agricultural harvester and the receiving vehicle based on the signal indicative of flow through the transfer mechanism and the storage dimensions relative to the receiving vehicle.

19 Claims, 4 Drawing Sheets

(51) Int. Cl.
*B65G 67/22* (2006.01)
*G05D 1/02* (2020.01)
*H04L 67/12* (2022.01)

(52) U.S. Cl.
CPC ....... *G05D 1/02* (2013.01); *G05D 2201/0201* (2013.01); *H04L 67/12* (2013.01)

(56) References Cited

U.S. PATENT DOCUMENTS

| | | | | |
|---|---|---|---|---|
| 2002/0083695 | A1* | 7/2002 | Behnke | A01B 69/008 56/119 |
| 2008/0245042 | A1* | 10/2008 | Brunnert | A01D 43/087 56/10.2 F |
| 2009/0099775 | A1 | 4/2009 | Mott et al. | |
| 2009/0325658 | A1* | 12/2009 | Phelan | G01F 13/005 460/6 |
| 2011/0066337 | A1* | 3/2011 | Kormann | A01D 43/073 701/50 |
| 2011/0307149 | A1 | 12/2011 | Pighi et al. | |
| 2012/0215409 | A1* | 8/2012 | Wang | A01D 41/1278 701/50 |
| 2013/0211675 | A1* | 8/2013 | Bonefas | A01B 69/008 701/41 |
| 2014/0083556 | A1* | 3/2014 | Darr | A01D 43/087 141/1 |
| 2015/0149048 | A1* | 5/2015 | Menke | G01J 1/0242 701/50 |
| 2015/0168187 | A1* | 6/2015 | Myers | G01F 1/80 73/861.73 |
| 2015/0327440 | A1* | 11/2015 | Dybro | A01D 45/021 73/862.541 |
| 2016/0003656 | A1* | 1/2016 | Gelinske | A01D 41/1273 73/861.18 |
| 2017/0042090 | A1* | 2/2017 | Bonefas | A01D 43/087 |
| 2017/0094901 | A1* | 4/2017 | French, Jr. | A01F 12/46 |
| 2017/0118914 | A1* | 5/2017 | Bruns | A01D 41/1272 |
| 2017/0235471 | A1* | 8/2017 | Scholer | G01F 1/666 715/772 |
| 2018/0027734 | A1* | 2/2018 | Hien | A01D 43/085 |
| 2018/0047177 | A1* | 2/2018 | Obropta | G06T 7/0012 |
| 2020/0128740 | A1* | 4/2020 | Suleman | A01D 61/02 |

FOREIGN PATENT DOCUMENTS

| | | |
|---|---|---|
| EP | 2526752 A1 | 11/2012 |
| EP | 3111741 A1 | 1/2017 |
| EP | 3139237 A1 | 3/2017 |

* cited by examiner

AUTOMATED FILL STRATEGY FOR GRAIN CART USING OPEN-LOOP VOLUMETRIC ESTIMATION OF FILL LEVEL

FIELD OF THE DESCRIPTION

The present description generally relates to agricultural harvesting equipment. More specifically, but not by limitation, the present description relates a system and method for managing the unloading of agricultural material from a harvesting vehicle.

BACKGROUND

Agricultural harvesters, such as a combine, generally accumulate harvested material during operation. During harvesting operations, it sometimes becomes necessary to transfer the harvested material from the harvester so that the harvester does not reach its storage capacity. Typically, a receiving vehicle, such as a grain cart, is positioned next to the harvester as the harvester moves through the field. A transfer mechanism, such as an auger, transfers the agricultural material from the harvester to the receiving vehicle. As the transfer mechanism transfers the agricultural material to the receiving vehicle, it is occasionally necessary to adjust the position of the receiving vehicle and/or transfer mechanism so that the agricultural material does not flow over the walls of the receiving vehicle and instead begins filling a lesser-filled location within the receiving vehicle. This process occurs until the receiving vehicle is filled to an acceptable level, at which time the filled receiving vehicle drives away from the harvester and another fill vehicle is brought into proximity of the harvester. The process repeats until the harvester is unloaded to a sufficient level.

Systems and methods for controlling the relative position of the harvester and receiving vehicle have been developed. Some systems use machine vision to optically monitor the level of agricultural material at a position of the transfer mechanism while the transfer mechanism conveys the agricultural material to the receiving vehicle. When the optical system sees that the level of agricultural product at the position of the transfer mechanism has reached a certain level, the system can automatically adjust the position or prompt the operator to adjust the position. This is an example of a closed-loop fill monitoring system in that the view of the receiving vehicle is used as feedback to determine when to adjust relative positioning between the harvester and the receiving vehicle.

Some closed-loop systems may be limited in situations where the sensors required for closed-loop operation, such as cameras, are obscured or covered by dust or agricultural residue. In other situations, closed-loop systems may be limited in that they require additional components (i.e. one or more cameras and machine vision) to be installed on the harvester. Thus, the applicability of closed-loop systems to legacy harvesters (bearing no modification or configuration to facilitate fill management) is limited.

The discussion above is merely provided for general background information and is not intended to be used as an aid in determining the scope of the claimed subject matter.

SUMMARY

An agricultural harvester includes a cutting head configured to harvest an agricultural material, a transfer mechanism configured to transfer the harvested agricultural material from the agricultural harvester, and a fill management system. The fill management system is configured to provide open-loop control of an automated transfer of the agricultural material from the agricultural harvester. The fill management system includes a controller, a user interface module coupled to the controller and configured to receive user input indicative of a selected nudge direction, and a wireless communication module coupled to the fill management system and configured to communicate wirelessly with a receiving vehicle. The wireless communication module is configured to obtain storage dimensions relative to the receiving vehicle from the receiving vehicle. At least one sensor is operably coupled to the transfer mechanism and provides a sensor signal that is indicative of flow of the agricultural material through the transfer mechanism. The controller is configured to automatically generate relative positional adjustments between the agricultural harvester and the receiving vehicle based on the signal indicative of flow through the transfer mechanism and the storage dimensions relative to the receiving vehicle.

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Embodiments described herein generally provide a system and method for managing the transfer of agricultural material such a grain, corn, et cetera from a harvester, such as a combine, to a receiving vehicle, such as a grain cart. Embodiments provided herein generally accomplish management of the transfer process without requiring closed-loop sensors or control. Thus, embodiments can be practiced without the use/need for camera hardware, image processing software, and spout control. Instead, using physical dimensions of the receiving vehicle (i.e. dimensions of the grain cart) and a mass flow sensor on the transfer mechanism (i.e. unloading spout/auger) the harvesting machine performs a computation based on the mass flow sensor signal, dimensions, and time to provide an open-loop fill estimate. This fill estimate can then be used to adjust relative positioning between the harvester and the receiving vehicle (e.g. nudge the grain cart's relative position to the harvester) to complete a rough fill strategy. In this way, embodiments described herein generally provide a low-cost solution to management of agricultural material transfer from a harvester to a receiving vehicle.

Figure 1:
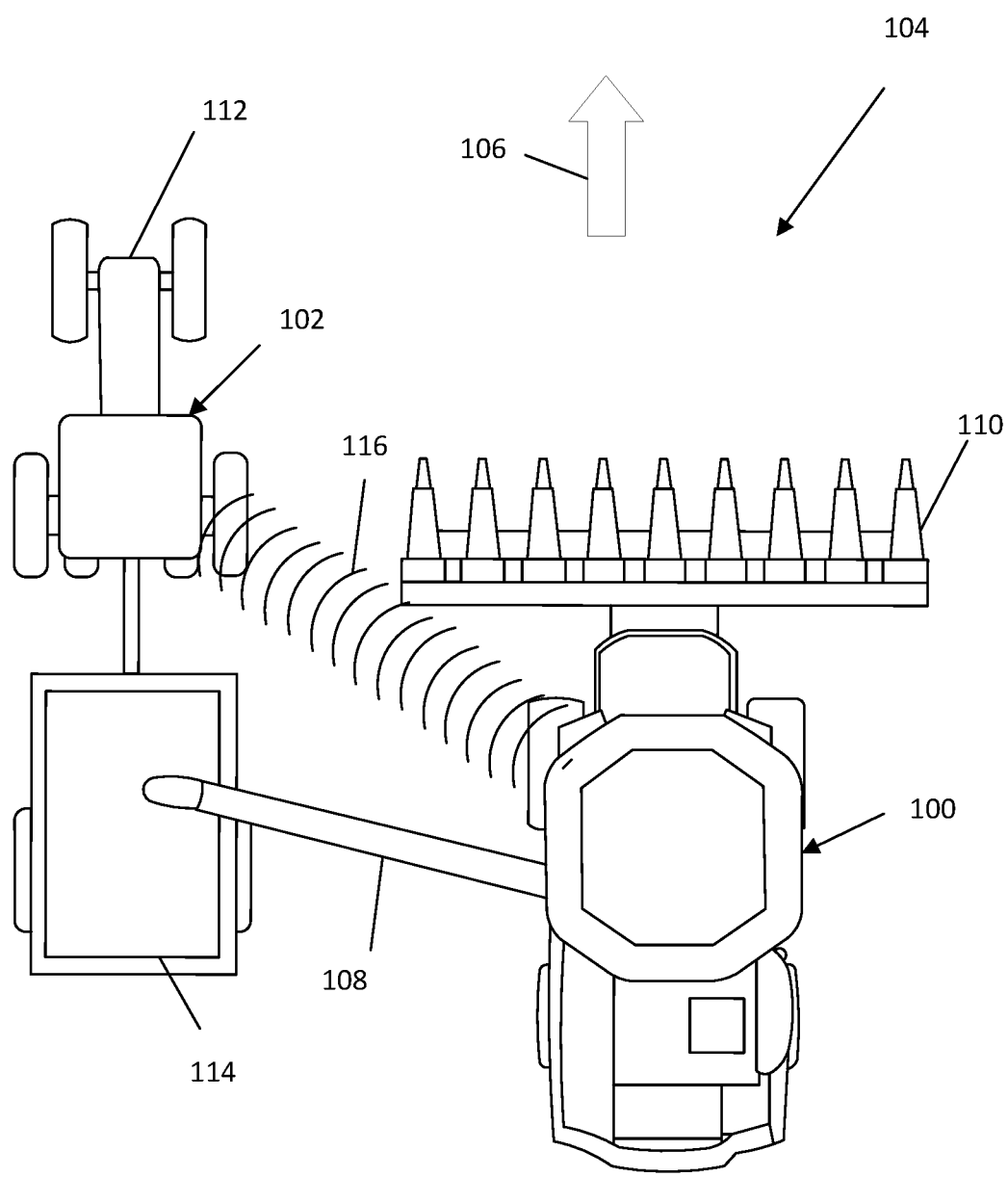
FIG. 1 is a plan view of an agricultural machine with which embodiments described herein are particularly applicable.

FIG. 1 is a plan view of an agricultural machine with which embodiments described herein are particularly applicable. FIG. 1 shows an agricultural harvester 100 and a receiving vehicle 102 positioned next to agricultural harvester 100 and travelling in the same direction of travel 106 such that a transfer mechanism 108 of agricultural harvester 100 can unload agricultural material into receiving vehicle 102. Collectively, agricultural harvester 100 and receiving vehicle 102 can be considered an agricultural material transfer system. For purposes of explanation, agricultural harvester 100 is shown as a combine with a harvesting head 110 and receiving vehicle 102 is shown as a tractor and grain cart. Receiving vehicle 102 includes the combination of the tractor 112 and storage portion 114 towed by tractor 112. As agricultural harvester 100 and receiving vehicle 102 move in direction 106, they maintain a relative state of alignment or coordination in order to achieve the transfer of the agricultural material from agricultural harvester 100 to receiving vehicle 102. The heading and/or speed of agricultural harvester 100 and receiving vehicle 102 may vary occasionally to generate changes in relative position in order to cause transfer mechanism to deposit the agricultural material into different locations of storage portion 114.

One of the ways that agricultural harvester 100 and receiving vehicle 102 generate relative movement is by employing wireless communication. In one example, agricultural harvester 100 and receiving vehicle 102 both utilize a wireless radio-frequency (RF) network, indicated diagrammatically at reference numeral 116. Thus, when agricultural harvester 100 needs to generate a change in relative position, it will issue such a command (termed a "nudge") to receiving vehicle 102 via RF network 116. Receiving vehicle 102 received the nudge and momentarily changes its speed and/or heading in order to effect the relative position change. While it is possible to have the agricultural harvester generate its own speed/heading change, it is preferred that the receiving vehicle do so.

One example of a wireless automated machine coordination system is sold under the trade designation Machine Sync, available from John Deere and Company of Moline, Ill. Machine Sync creates a wireless network between the receiving vehicle and the harvester to enable on-the-go unloading through synchronization of receiving vehicle speed and direction of travel with the harvester.

Machine Sync facilitates: communication between operators of the harvester and the receiving vehicle; matching speeds between harvester and the receiving vehicle; awareness of upcoming waterways and field contour and agreement how to navigate; and awareness of equipment size and position. Further, Machine Sync guides an approaching grain cart tractor to a predetermined "Home" position for unloading. This is a unique home point for that specific grain cart tractor/combine. Individual home points allow combines, tractors, and grain carts to have different configurations (duals, cart sizes, and unloading auger lengths). While embodiments described herein are particularly suited for use in combination with Machine Sync, embodiments can be practiced with any suitable communication system or techniques can be used to communicate between the harvester and receiving vehicle.

Figure 2:
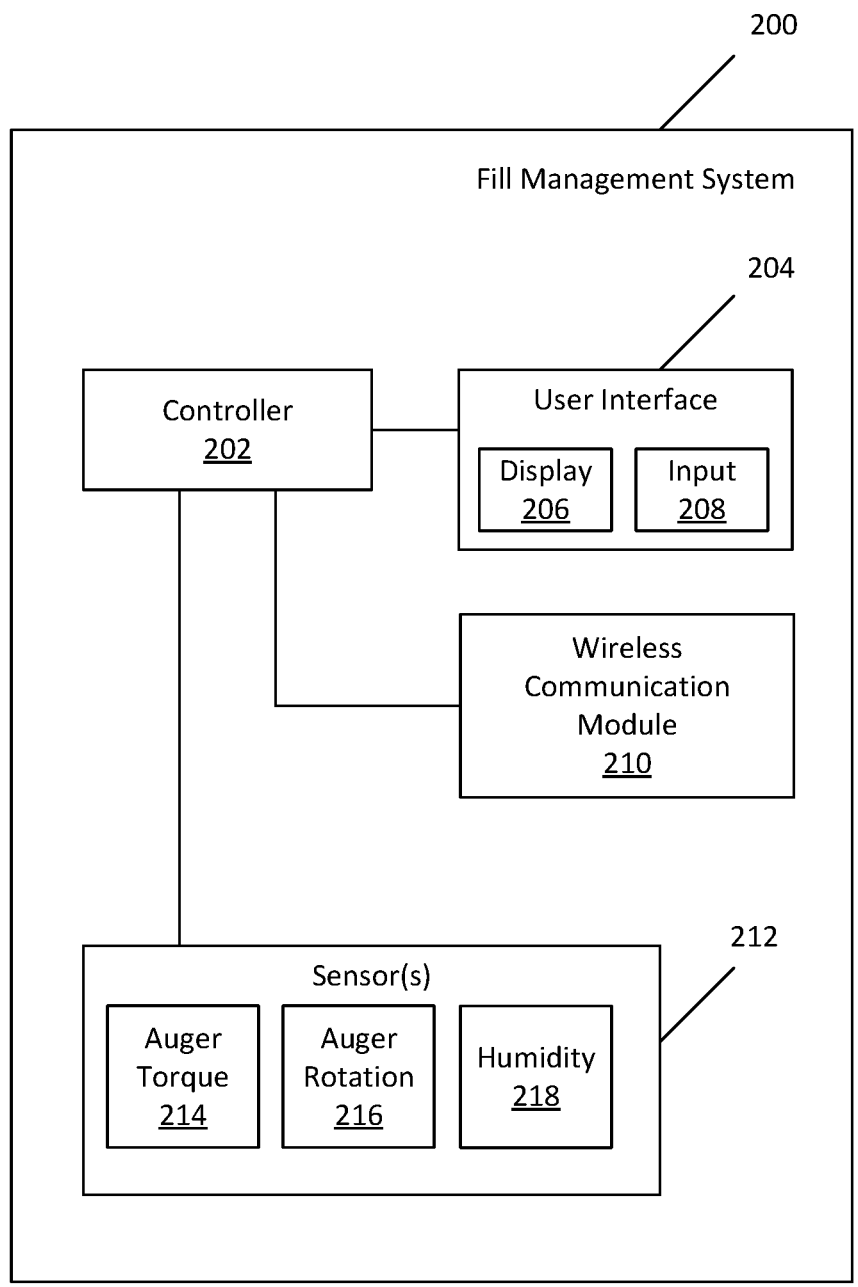
FIG. 2 is a diagrammatic view of a fill management system in accordance with an embodiment disclosed herein.

FIG. 2 is a diagrammatic view of a fill management system in accordance with an embodiment disclosed herein. System 200 can be embodied within an agricultural harvester as a separate, additional fill management system, or it may be embodied within the control system of the agricultural harvester. Further, in embodiments where the agricultural harvester shares sufficient information with the receiving vehicle (e.g. via Machine Sync), system 200 may be embodied within the receiving vehicle.

Fill management system 200 includes controller 202, which may include one or more microprocessors or other suitable logic or hardware configured to execute instructions stored within memory (not separately shown) within, or coupled to, controller 202 in order to provide fill management functions provided herein. Controller 202 may also be configured to support Machine Sync functions in some embodiments. Controller 202 is coupled to operator user interface module 204, which includes one or more displays 206 and one or more user input devices 208. The user input devices can include mechanisms such as hardware buttons, switches, joysticks, keyboards, et cetera, as well as virtual mechanisms or actuators such as a virtual keyboard or actuators displayed on a touch sensitive screen.

Fill management system 200 is configured to receive operator inputs via user interface module 204 that direct or otherwise affect fill management. For example, fill management system 200 will receive operator input indicative of the desired fill direction (i.e. back-to-front or front-to-back), which will determine the direction of subsequent nudges. Further, in some embodiments, fill management system 200 will also receive operator input of a desired automatic fill level (e.g. 75%) to be performed via the open-loop fill strategy disclosed herein. Then, once the desired fill level has been achieved, the operator can add subsequent fill using manual nudges.

Controller 202 is coupled to wireless communication module 210 to allow system 200 to at least send and preferably receive information in accordance with a wireless communication protocol. Wireless communication module 210 is configured to communicate in accordance with a suitable wireless communication protocol. Examples of such protocols include, without limitation, GSM networks including those operating upon 850 megahertz; 900 megahertz; 1800 megahertz; and 1900 megahertz; using any suitable cellular telephone data communication protocol such as mobile system for mobile communications (GSM); other suitable cellular telephone technology includes code division multiple access (CDMA). Further still, other wireless communications protocols can be employed including such wireless technologies as those in accordance with IEEE 802.11b, IEEE 802.11g, or Bluetooth. Further still, other data communication providers can be used, such as satellite communication, WiMax (IEEE 802.16 standard), IEEE 802.15.4, or any suitable wireless communication protocol later developed. In one embodiment, wireless communication module 210 is configured to support communication in accordance with the known Machine Sync system.

Controller 202 is also operably coupled to one or more sensors 212 on the agricultural harvester that provide information related to agricultural material transfer. In some embodiments, sensors 212 are legacy sensors already present on the agricultural harvester. However, embodiments can be practiced where additional sensors are added or configured in order to detect or measure material transfer. In embodiments where the transfer mechanism includes an auger, sensors 212 preferably include an auger torque sensor 214 that provides a signal (analog, digital, or a combination thereof) that is indicative of instantaneous torque applied to the auger. Further, in auger-based embodiments, sensors 212 also include an auger rotation sensor 216 that provides a signal (analog, digital, or a combination thereof) indicative of rotational speed of the auger. The auger rotation sensor 216 can be used to provide an indication of rotational speed or number of rotations of the auger. Additionally, in some embodiments, knowledge of humidity of the agricultural product or even the ambient environment may provide more accurate operation. Thus, some embodiments also include a humidity sensor 218 configured to measure humidity of the agricultural product, ambient environment, or both.

Figure 3:
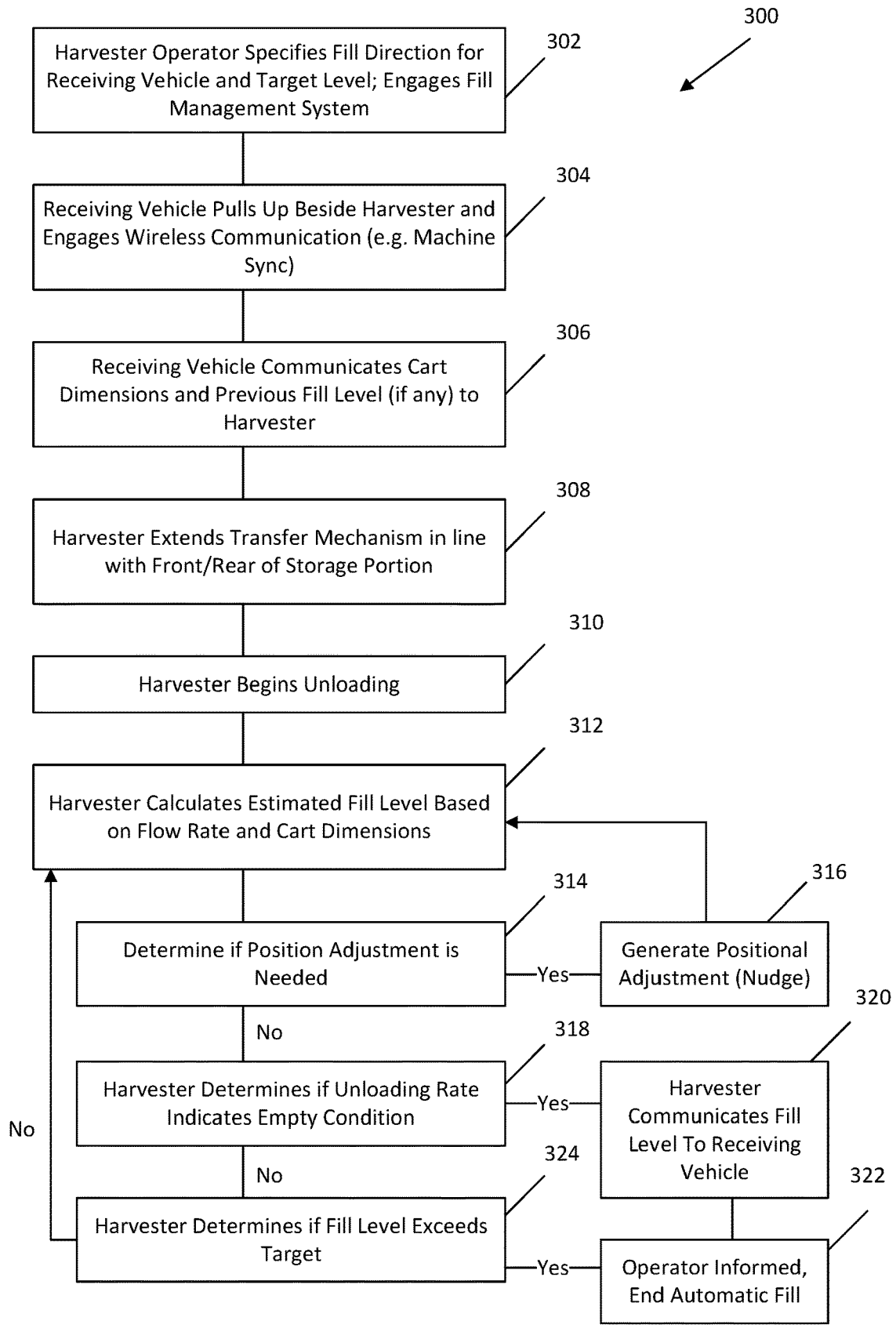
FIG. 3 is a flow diagram of a method of managing agricultural material transfer from a harvester to a receiving vehicle in accordance with one embodiment.

FIG. 3 is a flow diagram of a method of managing agricultural material transfer from a harvester to a receiving vehicle in accordance with one embodiment. Method 300 begins at block 302 where an operator of an agricultural harvester, such as harvester 100, specifies a fill direction using user interface module 204 of fill management system 200. Additionally, at block 302, the operator may also provide a target fill level, such as 75%. Once the initial fill parameters have been provided, the operator provides a user input, via user input device(s) 208 to enable or otherwise engage automated fill management system 200. When this occurs, a request is sent to a suitable receiving vehicle, such as a grain cart, to summon the receiving vehicle 102 to the harvester 100. This request can be performed using any suitable communication including Machine Sync or even via operator to driver audio communication.

As the receiving vehicle nears the harvester, block 304 executes where Machine Sync or some other suitable wireless communication system is engaged between the harvester 100 and the receiving vehicle. Next, at block 306, harvester 100 and receiving vehicle can exchange information. This is important in that the receiving vehicle can provide the harvester with information about the physical dimensions of storage portion 114 as well as an indication of a level of fill already present in storage portion 114, if it already contains some agricultural material. Based on the physical dimensions of storage portion 114 and known nudge distance, system 200 determines a number of nudges required to fill storage portion 114 to the operator selected fill level. Next, at block 308, the harvester positions the transfer mechanism 108 to be inline with the front/rear of storage portion 114. In embodiments that employ an auger and spout, the harvester 100 positions the spout inline with the front/rear of storage portion 114.

At block 310, the harvester engages transfer mechanism 108 to begin transferring the agricultural material from harvester 100 to receiving vehicle 102. In embodiments that employ an auger, this means that the harvester energizes a motor or other suitable drive mechanism to turn the auger thereby moving the agricultural material from a storage location within harvester 100 to the spout of the auger and ultimately dropping into storage portion 114 of receiving vehicle 102.

At block 312, system 200 calculates an estimated fill level at the current position of storage portion 114 relative to the location of the spout of harvester 100. In one embodiment, this estimation is based on measured mass flow rate of the agricultural material through transfer mechanism 108, the known dimensions of storage portion 114, the previous fill level, if any, of storage portion 114 and time. The mass flow rate can be measured as a function of two harvester sensors: auger rpm sensor 216 and auger torque sensor 214. This information provides an indication of the power (such as horsepower or watts) used to drive the auger. This power value combined with an estimate of the agricultural material density provides a useful estimation of the volumetric flow rate through the auger. The crop density may be estimated as a default value, or a default value for a particular agricultural material (such as corn or grain—entered by the operator via user interface module 204) modified by the humidity value provided by humidity sensor 218 or the harvester operator. In another embodiment, the mass flow value can be used to determine whether the agricultural material is flowing through transfer mechanism and then the volumetric flow can be estimated based on the internal auger geometry and auger rotational speed measured using sensor 216. In still another embodiment, the harvester operator can simply provide an indication that the auger is transferring agricultural material (vs. operating and not providing material, e.g. when empty or initially during startup) and system 200 can estimate volumetric flow based on the signal provided by RPM sensor 216. In any event, during block 312, system 200 calculates an estimated fill level based on operation of transfer mechanism, physical dimensions of storage portion 114 and a level of previous fill, if any, of storage portion 114.

At block 314, controller 202 determines, based on the estimated fill level computed during block 312, whether a position adjustment (nudge) is needed. If so, control passes to block 316 where a nudge command is generated. In one embodiment, this nudge command is generated by harvester 100 based on the selected nudge direction and nudge distance and transmitted wirelessly to receiving vehicle 102. Upon receiving the nudge command, receiving vehicle 102 adjusts its speed and/or heading until the requested relative positional adjustment (nudge) is completed, at which time, control returns to block 312 where method 300 partially repeats.

If, at block 314, controller 202 determines that a relative positional adjustment is not required, then control passes to block 318 where controller 202 determines whether the transfer mechanism has reached an empty threshold (i.e. all or substantially all of the agricultural material has been transferred from harvester 100). One way this determination can be performed is where controller 202 monitors auger torque (using sensor 214) while auger rpm sensor 216 measures a substantially constant speed. If the auger torque, as measured by sensor 214, decreases relatively suddenly, while the auger rpm is constant, or even increases slightly, controller 202 can detect that the agricultural material has fallen below an empty threshold. However, embodiments can be practiced where other sensors or techniques are employed to determine that the harvester is substantially emptied of agricultural material. When this condition is satisfied, control passes to block 320 where harvester 100 communicates, preferably using Machine Sync, the current fill level to receiving vehicle 102, after which control passes to block 322 where the operator of harvester 100 is informed, and system 200 ends the automated open-loop fill management described herein.

If, however, at block 318, controller 202 determines that the harvester is not yet empty, then control passes to block 324 where controller 202 determines whether the fill level exceeds the selected target. If so, control passes to block 322 where the operator of harvester 100 is informed of the fill level exceeding the target and the automated fill operation is stopped. At this time, the operator may continue to fill an additional amount of storage portion 114 manually or may simply end the filling process with respect to the current receiving vehicle in order to allow a new receiving vehicle to take its place, at which time, method 300 can be repeated for the new receiving vehicle. However, if controller 202, at block 324, determines that the fill level has not yet exceeded the selected fill level, then control returns to block 312 via line 326.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors, processing systems, controllers and/or servers. In one example, these can include computer processors with associated memory and timing circuitry, not separately shown. They are functional parts of the systems or devices to which they belong and are activated by, and facilitate the functionality of, the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

Also, the figures show a number of blocks with functionality ascribed to each block. It will be noted that fewer blocks can be used so the functionality is performed by fewer components. Also, more blocks can be used with the functionality distributed among more components.

Figure 4:
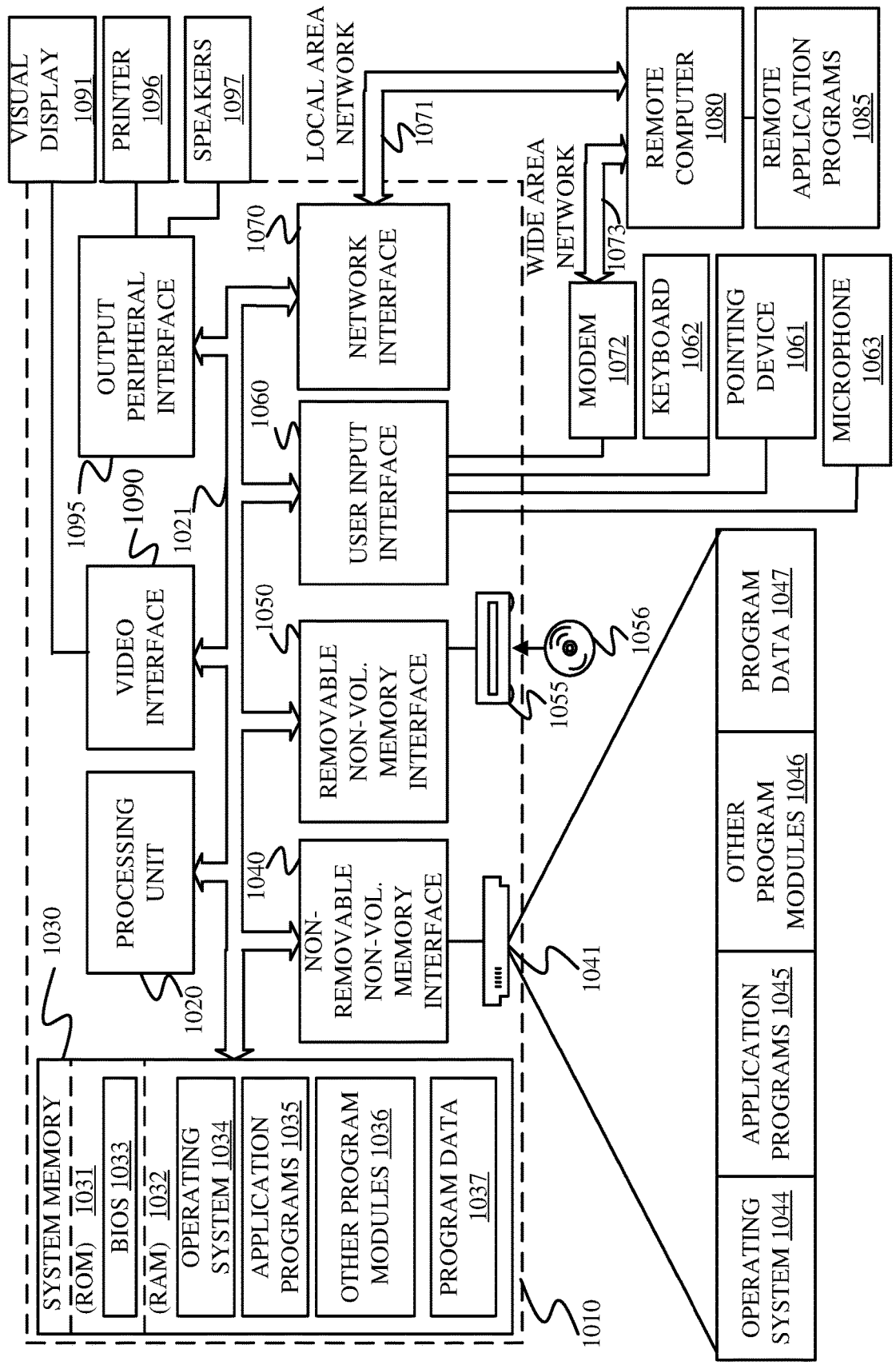
FIG. 4 is one example of a computing environment in which elements of FIG. 2, or parts of it, (for example) can be deployed.

FIG. 4 is one example of a computing environment in which elements of FIG. 2, or parts of it, (for example) can be deployed. With reference to FIG. 4, an example system for implementing some embodiments includes a computing device in the form of a computer 1010. Components of computer 1010 may include, but are not limited to, a processing unit 1020 (which can comprise processors or servers from previous FIGS.), a system memory 1030, and a system bus 1021 that couples various system components including the system memory to the processing unit 1020. The system bus 1021 may be any of several types of bus structures including a memory bus or memory controller, a peripheral bus, and a local bus using any of a variety of bus architectures. Memory and programs described with respect to FIG. 2 can be deployed in corresponding portions of FIG. 4.

Computer 1010 typically includes a variety of computer readable media. Computer readable media can be any available media that can be accessed by computer 1010 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1010. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 1030 includes computer storage media in the form of volatile and/or nonvolatile memory such as read only memory (ROM) 1031 and random access memory (RAM) 1032. A basic input/output system 1033 (BIOS), containing the basic routines that help to transfer information between elements within computer 1010, such as during start-up, is typically stored in ROM 1031. RAM 1032 typically contains data and/or program modules that are immediately accessible to and/or presently being operated on by processing unit 1020. By way of example, and not limitation, FIG. 4 illustrates operating system 1034, application programs 1035, other program modules 1036, and program data 1037.

The computer 1010 may also include other removable/non-removable volatile/nonvolatile computer storage media. By way of example only, FIG. 4 illustrates a hard disk drive 1041 that reads from or writes to non-removable, nonvolatile magnetic media, an optical disk drive 1055, and non-volatile optical disk 1056. The hard disk drive 1041 is typically connected to the system bus 1021 through a non-removable memory interface such as interface 1040, and optical disk drive 1055 is typically connected to the system bus 1021 by a removable memory interface, such as interface 1050.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 4, provide storage of computer readable instructions, data structures, program modules and other data for the computer 1010. In FIG. 4, for example, hard disk drive 1041 is illustrated as storing operating system 1044, application programs 1045, other program modules 1046, and program data 1047. Note that these components can either be the same as or different from operating system 1034, application programs 1035, other program modules 1036, and program data 1037.

A user may enter commands and information into the computer 1010 through input devices such as a keyboard 1062, a microphone 1063, and a pointing device 1061, such as a mouse, trackball or touch pad. Other input devices (not shown) may include a joystick, game pad, satellite dish, scanner, or the like. These and other input devices are often connected to the processing unit 1020 through a user input interface 1060 that is coupled to the system bus, but may be connected by other interface and bus structures. A visual display 1091 or other type of display device is also connected to the system bus 1021 via an interface, such as a video interface 1090. In addition to the monitor, computers may also include other peripheral output devices such as speakers 1097 and printer 1096, which may be connected through an output peripheral interface 1095.

The computer 1010 is operated in a networked environment using logical connections (such as a local area network—LAN, or wide area network—WAN or a controller area network—CAN) to one or more remote computers, such as a remote computer 1080.

When used in a LAN networking environment, the computer 1010 is connected to the LAN 1071 through a network interface or adapter 1070. When used in a WAN networking environment, the computer 1010 typically includes a modem 1072 or other means for establishing communications over the WAN 1073, such as the Internet. In a networked environment, program modules may be stored in a remote memory storage device. FIG. 4 illustrates, for example, that remote application programs 1085 can reside on remote computer 1080.

It should also be noted that the different examples described herein can be combined in different ways. That is, parts of one or more examples can be combined with parts of one or more other examples. All of this is contemplated herein.

Example 1 is an agricultural harvester includes a cutting head configured to harvest an agricultural material, a transfer mechanism configured to transfer the harvested agricultural material from the agricultural harvester, and a fill management system. The fill management system is configured to provide open-loop control of an automated transfer of the agricultural material from the agricultural harvester. The fill management system includes a controller, a user interface module coupled to the controller and configured to receive user input indicative of a selected nudge direction, and a wireless communication module coupled to the fill management system and configured to communicate wirelessly with a receiving vehicle. The wireless communication module is configured to obtain storage dimensions relative to the receiving vehicle from the receiving vehicle. At least one sensor is operably coupled to the transfer mechanism and provides a sensor signal that is indicative of flow of the agricultural material through the transfer mechanism. The controller is configured to automatically generate relative positional adjustments between the agricultural harvester and the receiving vehicle based on the signal indicative of flow through the transfer mechanism and the storage dimensions relative to the receiving vehicle.

Example 2 is the agricultural harvester of any or all of the previous examples wherein the controller is configured to transmit the relative positional adjustments to the receiving vehicle using the wireless communication module.

Example 3 is the agricultural harvester of any or all of the previous examples wherein the at least one sensor includes an auger speed sensor configured to provide a signal of auger rotational speed to the controller and wherein the controller is configured to generate the relative positional adjustments based on a number of turns of the auger.

Example 4 is the agricultural harvester of any or all of the previous examples wherein the at least one sensor includes an auger speed sensor configured to provide a signal of auger rotational speed to the controller and wherein the controller is configured to generate the relative positional adjustments based on a time duration that the auger operates at the auger rotational speed.

Example 5 is the agricultural harvester of any or all of the previous examples wherein the at least one sensor includes an auger torque sensor configured to provide a signal indicative of auger torque, and wherein the controller is configured to use the auger torque signal to determine when agricultural material is flowing through the auger while the auger is rotating.

Example 6 is the agricultural harvester of any or all of the previous examples wherein the agricultural harvester is a combine.

Example 7 is the agricultural harvester of any or all of the previous examples wherein the controller is configured to receive an indication of agricultural material density.

Example 8 is the agricultural harvester of any or all of the previous examples wherein the indication of agricultural material density includes an indication of crop type.

Example 9 is the agricultural harvester of any or all of the previous examples wherein the indication of agricultural material density includes an indication of humidity.

Example 10 is the agricultural harvester of any or all of the previous examples wherein the indication of humidity is received by the controller via the user interface.

Example 11 is the agricultural harvester of any or all of the previous examples wherein the indication of humidity is received by the controller via a humidity sensor.

Example 12 is the agricultural harvester of any or all of the previous examples wherein the controller is configured to receive previous fill information from the receiving vehicle using the wireless communication module.

Example 13 is a fill management system including a controller, a user interface module coupled to the controller and configured to receive user input indicative of a selected nudge direction, and a wireless communication module coupled to the fill management system and configured to communicate wirelessly. At least one sensor is communicatively coupled to controller and provides a sensor signal that is indicative of flow of agricultural material through a transfer mechanism of an agricultural harvester. The controller is configured to automatically generate relative positional adjustments between the agricultural harvester and a receiving vehicle based on the signal indicative of flow through the transfer mechanism and storage dimensions relative to the receiving vehicle.

Example 14 is the fill management system of any or all of the previous examples wherein the fill management system is embodied within an agricultural harvester.

Example 15 is the fill management system of any or all of the previous examples wherein the fill management system is embodied within a receiving vehicle.

Example 16 is the fill management system of any or all of the previous examples wherein the sensor signal is received by the controller via the wireless communication module.

Example 17 is a method of transferring agricultural material from an agricultural harvester to a receiving vehicle. The method includes positioning a transfer mechanism relative to the receiving vehicle such that agricultural material falling from the transfer mechanism falls into the receiving vehicle. The transfer mechanism is engaged to move the agricultural material from the agricultural harvester to the receiving vehicle. Flow through the transfer mechanism is measured to provide an open-loop estimate of volumetric flow into the transfer vehicle. Based on the estimate of volumetric flow, a plurality of positional adjustments are generated between the receiving vehicle and the agricultural harvester where the time period between positional adjustments is based on the open-loop estimate of volumetric flow.

Example 18 is the method of transferring agricultural material from an agricultural harvester to a receiving vehicle as set forth in any or all of the previous examples and further comprising generating the positional adjustments within a controller and communicating the positional adjustments wirelessly to the receiving vehicle.

Example 19 is the method of transferring agricultural material from an agricultural harvester to a receiving vehicle as set forth in any or all of the previous examples wherein the method is performed until the agricultural harvester is empty.

Example 20 is the method of transferring agricultural material from an agricultural harvester to a receiving vehicle as set forth in any or all of the previous examples wherein the method is performed until the receiving vehicle is filled to a selected capacity.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An agricultural harvester comprising:
   a cutting head configured to harvest an agricultural material;
   a transfer mechanism configured to transfer the harvested agricultural material from the agricultural harvester; and
   a fill management system configured to provide open-loop control of an automated transfer of the agricultural material from the agricultural harvester, the fill management system including:
      a controller;
      a user interface module coupled to the controller and configured to receive user input indicative of a selected nudge direction;
      a wireless communication module coupled to the fill management system and configured to communicate wirelessly with a receiving vehicle, the wireless communication module being configured to obtain storage dimensions relative to the receiving vehicle from the receiving vehicle;
      at least one sensor operably coupled to the transfer mechanism and providing a sensor signal that is indicative of flow of the agricultural material through the transfer mechanism; and
      wherein the controller is configured to automatically generate relative positional adjustments between the agricultural harvester and the receiving vehicle based on the signal indicative of flow through the transfer mechanism and storage dimensions relative to the receiving vehicle and to transmit the relative positional adjustments to the receiving vehicle using the wireless communication module.

2. The agricultural harvester of claim 1, wherein the at least one sensor includes an auger speed sensor configured to provide a signal of auger rotational speed to the controller and wherein the controller is configured to generate the relative positional adjustments based on number of turns of the auger.

3. The agricultural harvester of claim 1, wherein the at least one sensor includes an auger speed sensor configured to provide a signal of auger rotational speed to the controller and wherein the controller is configured to generate the relative positional adjustments based on a time that the auger operates at the auger rotational speed.

4. The agricultural harvester of claim 1, wherein the at least one sensor includes an auger torque sensor configured to provide a signal indicative of auger torque, and wherein the controller is configured to use the auger torque signal to determine when agricultural material is flowing through the auger while the auger is rotating.

5. The agricultural harvester of claim 1, wherein the agricultural harvester is a combine.

6. The agricultural harvester of claim 1, wherein the controller is configured to receive indication of agricultural material density.

7. The agricultural harvester of claim 6, wherein the indication of agricultural material density includes an indication of crop type.

8. The agricultural harvester of claim 6, wherein the indication of agricultural material density includes an indication of humidity.

9. The agricultural harvester of claim 8, wherein the indication of humidity is received by the controller via the user interface.

10. The agricultural harvester of claim 8, wherein the indication of humidity is received by the controller via a humidity sensor.

11. The agricultural harvester of claim 1, wherein the controller is configured to receive previous fill information from the receiving vehicle using the wireless communication module.

12. A fill management system embodied within a receiving vehicle, the fill management system comprising:
    a controller;
    a user interface module coupled to the controller and configured to receive user input indicative of a selected nudge direction;
    a wireless communication module coupled to the fill management system and configured to communicate wirelessly;
    at least one sensor communicatively coupled to the controller, the at least one sensor providing a sensor signal that is indicative of flow of agricultural material through a transfer mechanism of an agricultural harvester; and
    wherein the controller is configured to receive the sensor signal via the wireless communication module and to automatically generate relative positional adjustments between the agricultural harvester and the receiving vehicle based on the signal indicative of flow through the transfer mechanism and storage dimensions relative to the receiving vehicle.

13. The fill management system of claim 12, wherein the at least one sensor comprises an auger speed sensor configured to detect a rotation speed of an auger of the transfer mechanism.

14. The fill management system of claim 12, wherein the at least one sensor comprises an auger torque sensor configured to detect a torque applied to an auger of the transfer mechanism.

15. A method of transferring agricultural material from an agricultural harvester to a receiving vehicle, the method comprising:
    positioning a transfer mechanism relative to the receiving vehicle such that agricultural material falling from the transfer mechanism falls into the receiving vehicle;
    engaging the transfer mechanism to move the agricultural material from the agricultural harvester to the receiving vehicle;

measuring flow through the transfer mechanism to provide an open-loop estimate of volumetric flow into the transfer vehicle;

based on the estimate of volumetric flow, generating a plurality of positional adjustments between the receiving vehicle and the agricultural harvester wherein the time period between positional adjustments is based on the open-loop estimate of volumetric flow; and generating the positional adjustments with a controller and communicating the positional adjustments wirelessly to the receiving vehicle.

16. The method of claim 15, wherein the method is performed until the agricultural harvester is empty.

17. The method of claim 15, wherein the method is performer until the receiving vehicle is filled to a selected capacity.

18. The method of claim 15, wherein measuring flow through the transfer mechanism to provide the open-loop estimate of volumetric flow into the transfer vehicle comprises:

receiving a sensor signal from an auger speed sensor indicative of a rotation speed of an auger of the transfer mechanism.

19. The method of claim 15, wherein measuring flow through the transfer mechanism to provide the open-loop estimate of volumetric flow into the transfer vehicle comprises:

receiving a sensor signal from an auger torque sensor indicative of a torque applied to an auger of the transfer mechanism.

* * * * *